United States Patent [19]
Lennie et al.

[11] Patent Number: 5,974,574
[45] Date of Patent: Oct. 26, 1999

[54] METHOD OF COMPARING REPLICATED DATABASES USING CHECKSUM INFORMATION

[75] Inventors: Robert Lennie, Sunnyvale; Charles W. Johnson; Larry Emlich, both of San Jose; John Lonczak, Sunnyvale, all of Calif.

[73] Assignee: Tandem Computers Incorporated, Cupertino, Calif.

[21] Appl. No.: 08/940,447

[22] Filed: Sep. 30, 1997

[51] Int. Cl.⁶ .................................................. G06F 11/00
[52] U.S. Cl. ............................................................ 714/52
[58] Field of Search ...................... 395/182.04, 185.05; 714/6, 52, 807; 371/53; 707/204

[56] References Cited

U.S. PATENT DOCUMENTS

| | | | |
|---|---|---|---|
| 3,789,204 | 1/1974 | Barlow | 235/153 AM |
| 4,817,091 | 3/1989 | Katzman et al. | 371/9 |
| 5,574,849 | 11/1996 | Sonnier et al. | 395/182.1 |
| 5,649,089 | 7/1997 | Kilner | 395/182.04 |
| 5,765,172 | 6/1998 | Fox | 707/204 |
| 5,778,395 | 7/1998 | Whiting et al. | 707/204 |
| 5,819,020 | 10/1998 | Beeler, Jr. | 395/182.03 |
| 5,832,235 | 3/1997 | Wilkes | 395/200.77 |
| 5,870,759 | 2/1999 | Bauer et al. | 707/201 |
| 5,898,836 | 4/1999 | Freivald et al. | 395/200.48 |
| 5,901,320 | 5/1999 | Takahashi et al. | 395/712 |

OTHER PUBLICATIONS

Chesson, "Packet Driver Protocol", http:/208.240.89.248/papers/chesson.html, pp. 1–6, Aug. 1991.

A Parity Structure for Large Remotely Located Replicated Data Files by John J. Metzner, 8092 IEEE Transactions on Computers vol. C–32 (1983) Aug., No. 8, New York, USA.

An Optimal Strategy for Comparing File Copies by Khaled A.S. Abdel–Ghaffar and Amr El Abbadi, 8354 IEEE Transactions on Parallel and Distributed Systems 5 (1994) Jan., No. 1, New York, USA.

PCT International Search Report for International Application No. PCT/US 98/20417 filed Sep. 30, 1998.

*Primary Examiner*—Robert W. Beausoliel, Jr.
*Assistant Examiner*—Stephen C. Elmore
*Attorney, Agent, or Firm*—Townsend and Townsend and Crew LLP

[57] ABSTRACT

A method of checking a large and/or replicated databases includes forming a position sensitive checksum for each entry of the database to be used in the check. The checksums are then exclusive Ored with one another to form a first database checksum. Periodically, the checksums are again created from each of the entries of the check and a second database checksum formed and compared to the first for a match that indicate checked entries of the database have not changed. In another embodiment, a modification to one of the check entries may be provided, accompanied by a master checksum indicative of what the first checksum should be after the entry is modified. The database entry is modified, and a position checksum value for the entry as modified is created. The checksum value for the modified entry, and for the entry before the modification, are exclusive OR with the first checksum value, and that result compared with the master checksum to ensure that the modification was properly made and that the database remains credible.

7 Claims, 2 Drawing Sheets

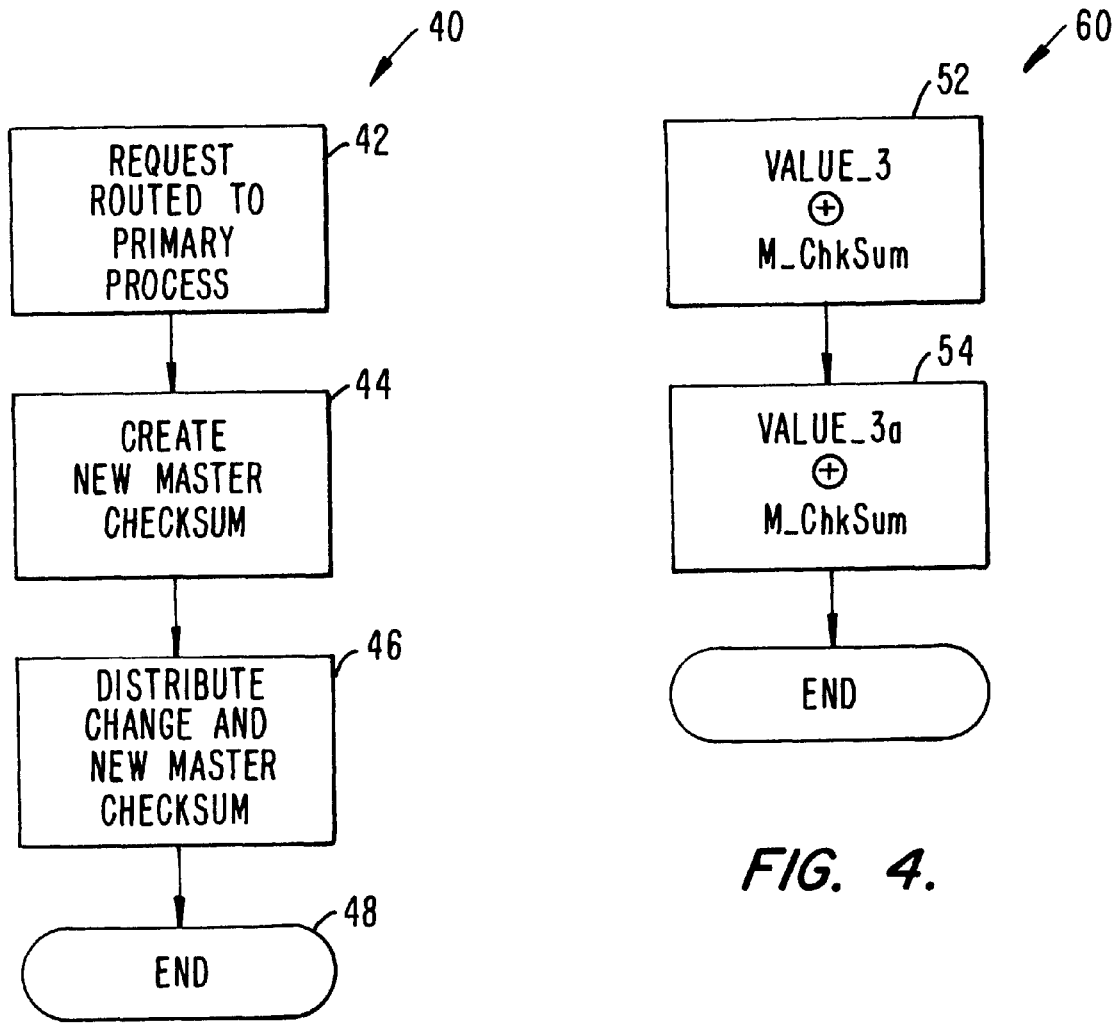

METHOD OF COMPARING REPLICATED DATABASES USING CHECKSUM INFORMATION

BACKGROUND OF THE INVENTION

The present invention relates generally to computing systems in which there are kept a number of replicated databases, and in particular to a method for comparing the databases quickly and efficiently.

Of the many approaches to fault tolerant computing available today, one seems likely to be around for some time. That approach is to provide a computing environment comprising multiple processor units so that if one processing unit fails, another is available to takeover. One example of this approach can be found in U.S. Pat. No. 4,817,091 which teaches a multiple processor system in which a processor unit of the system that is detected as having failed, will have the tasks of that failed processor unit taken over by a backup processor unit (or processor units).

This multiple processor system, with the advent of a novel communication network (described U.S. Pat. No. 5,574,849), has been extended to a multiple processing system in which groups of processor units are communicatively interconnected to form a "cluster." Each group (sometimes referred to as a "node") of processor units forms a distributed processing system that provides multiple processing power and some modicum of fault tolerance in that the load of a failed processor unit can be taken up by the other processor units of the group or node. The cluster arrangement, in turn, provides additional fault tolerance by providing backup nodes of processor units should one of the nodes fail.

In such a clustered environment, as well as other environments, it is required to provide each node with information concerning the cluster (e.g., the location of processor units, peripheral units, etc.), its use, its users, and the like. Often kept in a database of one sort or another, the amount of this information can be quite large. This leads to problems when the databases of each node need to be checked, such as when a periodic check needs to be made to ensure the integrity of the database and the information it contains, or to ensure that changes to the database were made correctly. Such checks, however, can be very time consuming, and tend to impose a significant burden on system resources, particularly if such checks are frequently required. If the checks require communication between two nodes across a communication path, the amount of communication can be significant and create a bottleneck.

Thus, it can be seen that a way to check the integrity of databases in a quick, efficient, and trusted manner would benefit the overall performance of a multiple processor system using replicated databases of information. Resources needed elsewhere need be used for only the short time the check is conducted.

SUMMARY OF THE INVENTION

The present invention provides a method of performing a check or comparison of a database in a rapid, efficient, and trusted manner.

The invention is most advantageously used in a multiple processing system in which distributed copies of a master database are kept. Broadly, the invention involves creating, for the master database, and each distributed copy, a position sensitive checksum value for the database elements. Each checksum value is then exclusive ORed (XOR) with each other checksum value to form a database checksum that is representative of the integrity of the state of the database at the point of time the database checksum was created. At a later date, a process responsible for maintaining the master database will receive a request to modify the database. That process will first make the modification to the master database (e.g., delete a value and replace it with a new value). Then, the master checksum is updated to reflect the deletion by performing a simple XOR operation on the master checksum with the old checksum value. Next, the entry as modified will have a position sensitive checksum value created for it. This new checksum value is then XOR'd with the master checksum to reflect the addition of the new value. Thereby, a new master checksum is created that now represents the modified state of the database.

The copies of the master database must also reflect all modifications. Accordingly, the modification, together with the old and new master checksums, are distributed to the processes of the multiple processor system responsible for maintaining the database copies. There, the same procedure that was used to modify the master database is used to modify database copy to reflect, in the database checksum for that copy, the modification: the old and new checksum values for the modified entry are each XOR'd with the database checksum for that database. Then, that database checksum is compared with the copy of the new master checksum received with the modification (e.g., for equality). A favorable comparison will indicate that the copies of the database in all nodes are "synchronized" (i.e., matches) the master database. The converse, of course, signifies that the database has been corrupted, and must be re-synchronized to the master database. For error isolation, the old master checksum is also compared to the database checksum.

As will be evident, there are a number of advantages obtained by the present invention. First is that checking the integrity of even very large databases is much faster than by prior techniques. Previously, such checks were often made by comparing the database to a master database, entry by entry— a time consuming process. Second, integrity checks of the database after modification of an entry (or entries) is similarly much faster than heretofore. Rather than again initiating an entry-by-entry comparison of a copy of the database with a master, there need only be periodically provided the master checksum for comparison.

These and other features, aspects, and advantages will become apparent upon a reading of the detailed description of the invention, which should be taken in conjunction with the accompanying drawing.

BRIEF DESCRIPTION OF THE DRAWINGS

FIGS. 3 and 4 are flow diagrams that broadly illustrate operation of the present invention to check the integrity of the database of FIG. 2 after modification.

DESCRIPTION OF THE PREFERRED EMBODIMENT

Figure 1:
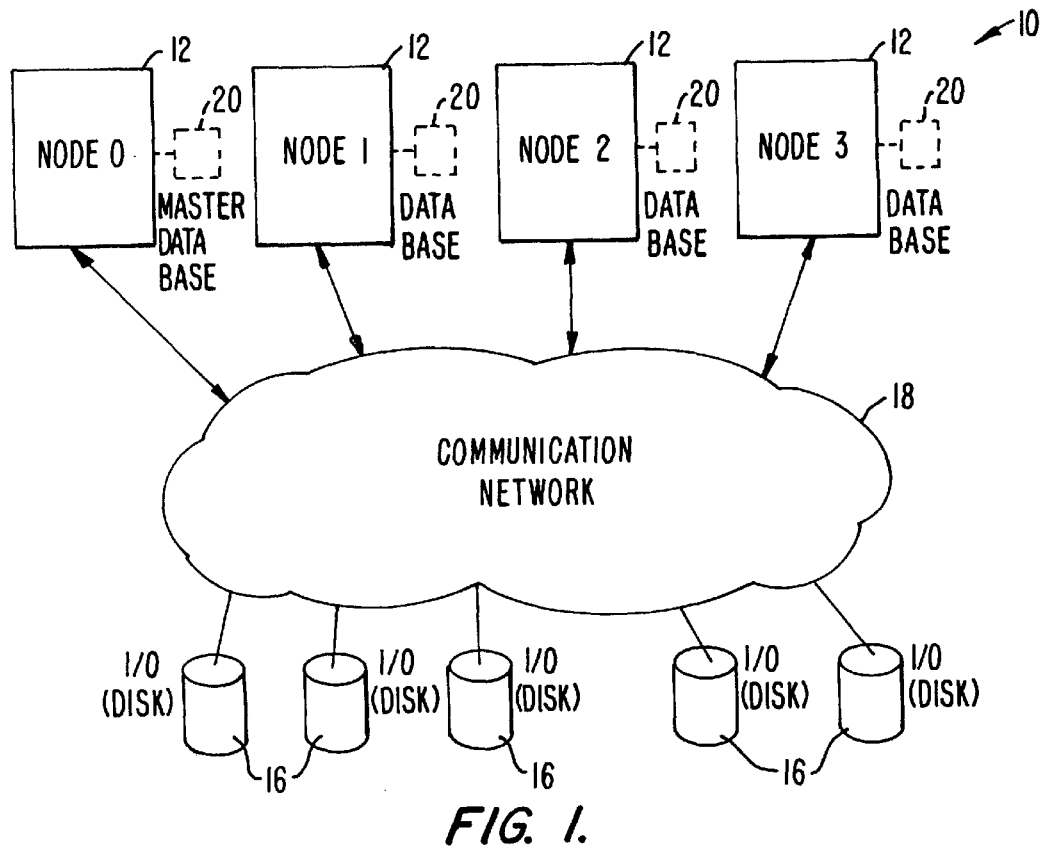
FIG. 1 is a simplified block diagram of a multiprocessing cluster, showing a number of nodes interconnected by a communications network.

The present invention was developed for use in a multiple processing system using a clustering architecture such as broadly illustrated in FIG. 1, although those skilled in this art will readily see that the invention can be advantageously employed in other computing environments. The multiple processing system in FIG. 1, designated generally with the reference numeral 10, is shown as including a number of multiprocessor nodes 12. For clarity, only four nodes are illustrated, although a greater number of nodes can be used. Although not specifically shown, also for sake of clarity, each node 12 comprises one or more processor units operating as a symmetric multiprocessor system under, for example, the Windows NT operating system (Windows, Windows NT, and NT are trademarks of Microsoft Corporation of Redmond, Wash.).

Each of the nodes 12 is connected to each of the other nodes 12, and to input/output devices 16 (here, illustrated as disk storage) by a communication network 18. In addition, each of the nodes maintains in memory a database 20 describing system configuration (e.g., preferences of known users, services available, etc.) that is, in fact, a portion of a larger database kept on a disk volume (i.e., disk storage 16). The database 20 is the registry used by the Windows NT operating system, supplemented for purposes not relevant to the understanding of this invention with additional information describing the system 10. The structure of a Windows NT registry database generally takes the form illustrated if FIG. 2 in which entries are conceptually associated with a branches and sub-branches. Thus, for example, a main branch or sub-branch (ROOT) has associated therewith "leaves" (KEY_1, KEY_2, etc.) that, in turn have corresponding values (e.g, VALUE_, VALUE_2, . . . ). In Windows NT terminology, the leaves or "keys" (and/or sub-keys) describe the associated value or data portion. Thus, the value, VALUE_5, is described by the keys KEY_3 and SUB_KEY_B of that leaf. Changes to such a database usually consist of changing the values.

The main version of the registry or database 20 (hereinafter referred to as the registry database 20) is preferably kept, by each node 12, in a disk volume that resides on disk storage unit 16, and only a portion of the registry database (e.g., that shown in FIG. 2) which may need frequent access is kept in memory—although the entire registry may be kept on disk, or it may all be made memory resident as conditions dictate.

Each node 12, as FIG. 1 illustrates, will have a copy of a master registry database that is maintained by one of the nodes 12—for example, Node 0. In order that there be consistency between the copies and the master registry database, all requests or other actions necessitating modification of the registry databases 20 are routed through the node (i.e, Node 0; or, more accurately, the primary process) responsible for maintaining the master registry database. The modification is made first to the master, and then distributed to the other nodes for modification of the copies. The modified copies can then be quickly compared to the modified master, using the teachings of the present invention as will be described below, to ensure that the modification did not somehow corrupt the copy.

Figure 2:
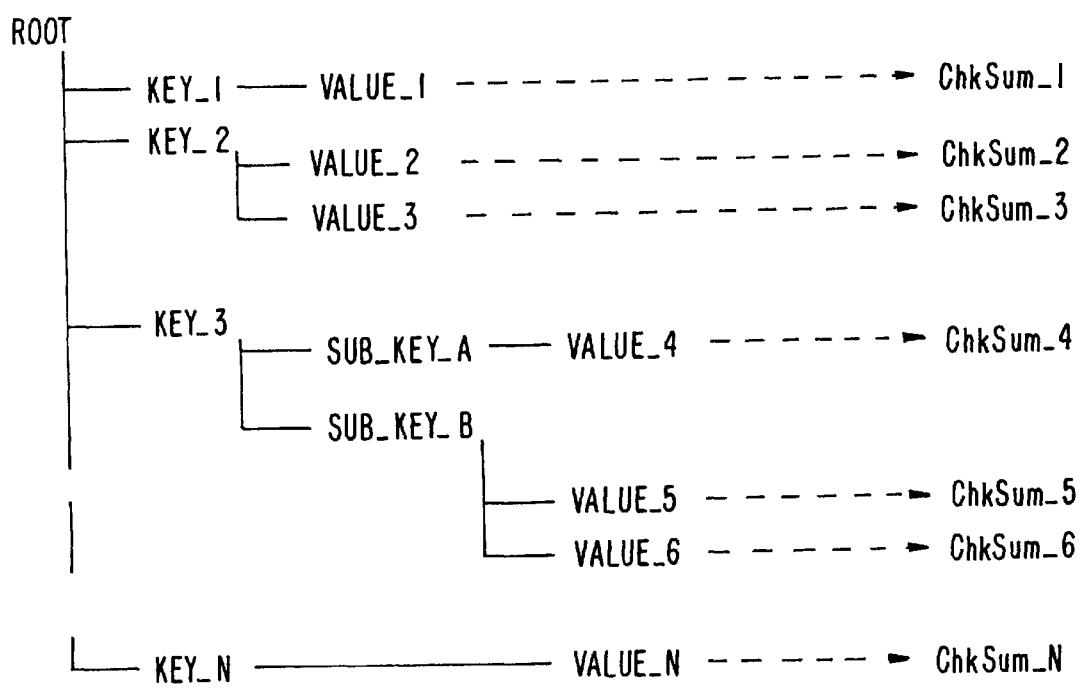
FIG. 2 is a simplified diagram of a database structure whose integrity can be checked using the teachings of the present invention.

Again, although the entire database registry 20 can be maintained in memory, assume that it is only that portion shown in FIG. 2 that is retained in memory with the remainder left on disk storage. (Of course, as will be seen, it will not affect the operation of the present invention if the entire registry database were kept on disk storage and retrieved, in whole or in part, when needed.) At some point in time, e.g., when the database registry portion is brought into memory of the particular node 20, a (64-bit) checksum value is created for each value (VALUE_1, VALUE_2, . . . , VALUE_N). Preferably, a position sensitive checksum algorithm is used to create each checksum. One such algorithm is described in the 1991 paper entitled "Packet Driver Protocol," by G. L. Chesson of Bell Laboratories. The position sensitive checksum algorithm proposed by that paper is set forth in Appendix A, attached hereto. Thus, as illustrated in FIG. 2, each of the values VALUE_1, VALUE_2, . . . VALUE_N, will produce corresponding position sensitive checksums ChkSum_1, ChkSum_2, . . . ChkSum_N, respectively.

Before continuing, it is important to note that although the entire "leaf" could be used to develop the position sensitive checksum for the leaf, only the value (or values of more than one) for that leaf is used. And, as will be seen, these checksums values are combined in a manner to be described to form a value that is indicative of the state of the database, and is primarily used as a check to ensure continued credibility of the database after being modified. The reason only the values are used is that it is the values that it is the values that are most likely to be modified; usually the keys do not change.

It is to be remembered, however, that the registry databases 20, or at least certain portions of them, maintained by the nodes 12 are substantial copies of one another and of the master database maintained by the primary process on Node 0. Modifications made to one registry database 20 must be reflected in all, particularly including the master database 20' (which, in fact, is the first to be modified).

The checksum values (Chksum_1, ChkSum_2, . . . , ChkSum_N, FIG. 2) that are created are then used to develop a database checksum (DB_ChkSum) that is indicative of the state of the database registry (or the portion thereof). The database checksum is created by a simple XOR operation of the checksums with one another, i.e., Chksum_1⊕Chksum_2⊕Chksum_3⊕ . . .

⊕Chksum_N=DB_ChkSum.

As indicated above, there will be one node responsible for coordinating changes in the registry maintained by each of the nodes 12 (see, e.g., co-pending patent application Ser. No. 08/941,478, filed Sep. 30, 1997). Any requests or other actions necessitating a change to the registry values, or other modification of the registry (e.g., such as the addition of a new entry or leaf) are funneled through a primary process that resides on, for example, Node 0. A registry change, therefore, will follow generally the process illustrated in FIGS. 3 and 4.

Turning first to FIG. 3, illustrated is the steps of the procedure 40 taken by the primary process (in combination with the procedure 60 of FIG. 4) to modify the master registry database 20' in response to a request to do so. A change or modification of the registry database kept by each of the nodes 12 is initiated by a request that may come from an external source (e.g., a new user signing onto the system 10) or internally (a change in system configuration caused, for example, by the addition or removal of a system element). That change or modification will be routed as a change request communication to the primary process residing on Node 0 as indicated by step 42 of the procedure 40. The primary process, in turn, will examine the request and, in response thereto, first initiate a change of a master registry database maintained on disk storage 16. Kept in association with the master registry is a corresponding master checksum (M_ChkSum) value that reflects the state of the master registry database. The modification of the master registry database necessitates a modification of the corresponding master checksum value in order that it properly represent the present (modified) state of the master registry database. Accordingly, at step 44, the primary process will modify the master checksum value to reflect the corresponding modification of the master registry database. The procedure (60) of modifying the master checksum value (M_ChkSum) is outlined in further detail in FIG. 4.

Assume that the change request communication resulted in a modification of the value Value_3, in effect replacing it with a new value: value_3a. Referring, then, to FIG. 4, step 52 operates to remove the effect of the old value, VALUE_3, from the master checksum by a simple (i.e., longitudinal) XOR of the checksum for the former value (i.e., ChkSum_3; FIG. 2) with the old master checksum, M_Chksum, that represented the state of the registry database before VALUE_3 was modified, i.e., $$ChkSum\_3 \oplus M\_ChkSum,$$

producing an intermediate master checksum M_ChkSum'.

Now, the effect of the new value, VALUE_3a, must be introduced to the master checksum to obtain a modified master checksum that correctly reflects that the registry database as modified with the new value, VALUE_3a. Thus, in step 54, a position sensitive checksum (ChkSum_3a) is created for the new value in the manner described above (and, of course, retained for later use if needed). Then, the newly-created checksum value (ChkSum_3a) is combined with the intermediate master checksum, M_ChkSum', again by a simple XOR operation, producing a new master checksum (M_ChkSum_a) that correctly represents the state of the changed registry database:

$$ChkSum\_3a \oplus M\_ChkSum' = M\_ChkSum\_a,$$

Returning to FIG. 3, having competed step 44 by creating a new master checksum (M_ChkSum_a) that correctly corresponds to the modified master registry database, the change is then distributed to all nodes (step 46; FIG. 3) so that they can also the change to their local registry databases. The change is accompanied by the new master checksum, M_ChkSum_a. When the change is received by the nodes 12, each will go through the same processes illustrated in the flow diagrams 50 and 60 of FIGS. 3 and 4 to make the change to the local registry database 20 and the corresponding database checksum. Then, having developed a database checksum that reflects the now-modified local registry database, that new database checksum is compared to the master checksum that accompanied the change. If they compare, the integrity of the change is known to be correct. If they do not compare, the attempted change most likely corrupted the local registry of the database, and steps must be taken to correct the suspect database registry. This is done by the affected node requesting a re-synchronization of the registry database (Or that portion of the registry database kept in memory) of the primary process on Node 0. The primary process, in turn, will communicate to the affected node a (correct) version of the registry database, or portion thereof.

Those skilled in this art will readily see, however, that the invention can be modified. For example, the order with which the database checksum is modified to reflect a change value is not important. Thus, rather than an XOR of the old checksum value with the database checksum followed by an XOR of the new checksum value, the XOR operations could be reversed: XOR with the new followed by an XOR with the old.

Continuing this last thought, the order would not matter even for multiple database element change. Thus, assume for example the elements VALUE_1, VALUE_3, and VALUE_6 are changed in the master database. To reflect those changes in the master checksum, any order can be used for the XOR operations between the master checksum and the corresponding checksums for both the old and VALUE_1, VALUE_3, and VALUE_6.

Further still, including in the checksum value the path (i.e., the leaves) for each value is not necessary if the location of the value remains unchanged. A check of the database will require, therefore, only the checksums for the values. However, if the path can be moved, it may be necessary that the move be reflected in the new database checksum. For example, suppose SUB_KEY_A and its associated values (here, only VALUE_4) is to be moved from KEY_3 to KEY_2, and it is desired to know that the move is correctly performed and the modified database exactly matches the master database. Therefore the checksums for each value will include the path data. For example, in FIG. 2, the position sensitive checksum, ChkSum1, would be created from the concatenation of the path identification ROOT, KEY_3, SUB_KEY_A and the corresponding value, VALUE_4. As indicated, the checksums for each value would be similarly created. If, then, using the XOR operations described above, the new database checksum should correctly reflect that SUB_KEY_A/VALUE_4 was moved from the path shown in FIG. 2 (i.e., extending from KEY_3) to its new path: ROOT—KEY_2.

In summary, there has been disclosed a simple and efficient method for checking the integrity of distributed databases, either periodically, or when changes are made. The method includes a fast and efficient technique for checking a database for corruption that may occur after changes are made.

APPENDIX A

The position sensitive checksum calculation is displayed below as a C function. Note that the code is not truly portable because the definitions of and are not necessarily uniform across all machines that might support this language. This code assumes that short and char are 16 short and char 8-bits respectively.

```
/* [Original document's version corrected to actual version] */
chksum(s,n)
register char *s;
register n;
{
    register short sum;
    register unsigned short t;
    register short x;
    sum = -1;
    x = 0;
    do {
        if (sum<0) {
            sum <<= 1;
            sum++;
        } else
            sum <<= 1;
        t = sum;
        sum += (unsigned)*s++ & 0377;
        x += sum n;
        if ((unsigned short)sum <= t) {
            sum = x;
        }
    } while (--n > 0);
    return(sum);
}
```

We claim:

1. In a processing system operating to maintain a database containing a plurality of entries and having a database checksum value indicative of integrity of the database, a method of updating the database checksum value after changing a one or more of the plurality of entries, including the steps of:

developing for each of at least a first number of the plurality of entries a first position sensitive checksum value;

exclusive Oring the first position sensitive checksum value of each of the first number of entries with one another to form the database checksum value;

modifying at least one of the first number of entries, developing a second position sensitive checksum value for the modified one of the first number of entries exclusive Oring the first position sensitive checksum value of the one entry and the second position checksum value with the database checksum value to create a modified database checksum value that reflects modification of the one of the first number of entries.

2. The method of claim 1, wherein the modifying step includes the step of, providing a master checksum value indicative of the database after modification; and including the step of comparing the master checksum value with the modified database checksum value.

3. The method of claim 2, wherein the master checksum value and the modified database checksum value are compared for equality.

4. In a distributed processing system having at least first and second processing nodes, a method of verifying correctness of modifications made to a distributed database that includes a master database and a copy of the master database ("copy") maintained by the first and second processing nodes, respectively, the master database and the copy each including a plurality of entries, each entry having an associated position sensitive checksum, the master database and the copy each having a master and copy checksum value, respectively, the method including the steps of:

forming a master checksum value that is indicative of the integrity of the master database by exclusive-oring the position sensitive checksums of the entries of the master database with one another;

forming, for each copy of the master database, a copy checksum value by exclusive-oring the position sensitive checksums of the entries of the each copy of the master database with one another;

modifying first a one of the plurality of entries of the master database to form a modified entry; creating a modified position sensitive checksum for the modified entry and exclusive-oring the modified checksum and checksum for the one of the plurality of entry with the master checksum to produce a modified checksum;

the master processing node communicating to the other of the number of processing nodes a request of modify a corresponding entry in the copies of the master database.

5. In a processing system having a first processor unit communicatively coupled to a second processor unit, the first and second processor units respectively operating to maintain distributed database comprising a master database and a copy of the master database each containing a plurality of entries, each of the plurality of entries of the master database having a corresponding identical entry in plurality of entries contained by the copy of the master database each of the plurality of entries of the master database and the copy of the master database having an associated position sensitive checksum, the master database and the copy of the master database respectively having an associated master checksum and copy checksum formed by exclusive-oring position sensitive checksum values for such database with one another, a method of changing an entry of the distributed database in response to a request for a change of at least one of the plurality of entries that includes the steps of:

receiving the request for the change at the first processor unit to change the one of the plurality of entries by forming a changed entry from the one of the plurality of entries and to creating an associated modified position sensitive checksum;

exclusive-oring the position sensitive checksum associated with the one of the plurality of entries and the modified position checksum with the master database checksum to form a modified master checksum;

communicating the request for change to the second processor unit together with the modified master checksum;

at the second processor unit, receiving the request for the change from the master processor unit to change the one of the plurality of entries to form a changed entry copy and an associated modified copy position sensitive checksum;

exclusive-oring the position sensitive checksum associated with the one of the plurality of entries of the copy of the master database and the modified copy position checksum with the database checksum to form a modified copy database checksum; and comparing the modified master checksum and the modified copy checksum to verify the integrity of the change of the copy of the master database.

6. An article of manufacture comprising a computer memory wherein is located a computer program for causing a processor unit, operating to maintain a database containing a plurality of entries and having an associated database checksum indicative of the integrity of the database, to update the database checksum when a one or more of at least a first number of the plurality of entries is changed, by developing for each of the first number of the plurality of entries a corresponding first position sensitive checksum value;

exclusive-oring the first position sensitive checksum value of each of the first number of entries with one another to form the database checksum value;

modifying at least one of the first number of entries, developing a second position sensitive checksum value for the modified one of the first number of entries exclusive Oring the first position sensitive checksum value of the one entry and the second position checksum value with the database checksum value to create a modified database checksum value that reflects modification of the one of the first number of entries.

7. A computer system comprising:

a communications network;

a plurality of processors, communicatively connected by means of said network, each of said plurality of processors operating to maintain a distributed database comprising a plurality of databases each associated with corresponding ones of the plurality of processors and each having a plurality of entries, each of the plurality of entries having a corresponding position sensitive checksum and a checksum value indicative of the integrity of such database formed by exclusive-oring the position sensitive checksums of such database with one another, the processor system having a respective memory wherein is located a computer program for causing said computer system to change an entry of the distributed database by, receiving the request for the change at a one of the plurality processor units to change the one of the plurality of entries forming a changed entry and to create a modified position sensitive checksum for the changed entry;

exclusive-oring the position sensitive checksum associated with the one of the plurality of entries and the modified position checksum with the master database checksum to form a modified master checksum;

communicating the request for change to the plurality of processor units together with the modified master checksum;

at each of the plurality of additional processing units, receiving the request for the change form the master processor unit to change the one of the plurality of entries forming a changed entry copy and to create a modified position sensitive checksum for the changed entry copy;

exclusive-oring the position sensitive checksum associated with the one of the plurality of entries and the modified position checksum with the database checksum to form a modified checksum; and comparing the modified checksum and the checksum value to check the integrity of the change to the copy of the master database.

* * * * *